United States Patent [19] [11] Patent Number: 4,833,792
Aehnelt et al. [45] Date of Patent: May 30, 1989

[54] PROBE HEAD FOR A COORDINATE MEASURING INSTRUMENT

[75] Inventors: Peter Aehnelt, Oberkochen; Eckhard Enderle, Aalen-Dewangen, both of Fed. Rep. of Germany

[73] Assignee: Carl-Zeiss-Stiftung, Heidenheim, Fed. Rep. of Germany

[21] Appl. No.: 141,719

[22] Filed: Jan. 11, 1988

[30] Foreign Application Priority Data

Jan. 20, 1987 [DE] Fed. Rep. of Germany ....... 8700885

[51] Int. Cl.[4] ............................................... G01B 7/28
[52] U.S. Cl. ........................................ 33/558; 33/561
[58] Field of Search ............... 33/556, 557, 558, 559, 33/560, 561, 169 R; 174/69, 99 E

[56] References Cited

U.S. PATENT DOCUMENTS

| 1,730,945 | 10/1929 | Poole | 174/69 |
| 2,206,703 | 7/1940 | Lowe | 174/69 |
| 4,136,458 | 1/1979 | Bell et al. | 33/143 L |
| 4,177,568 | 12/1979 | Werner et al. | 33/DIG. 13 |
| 4,188,750 | 2/1980 | Lohr | 446/443 |
| 4,608,763 | 9/1986 | Manns et al. | 33/561 |
| 4,702,013 | 10/1987 | McMurtry | 33/558 |
| 4,734,994 | 4/1988 | Cusack | 33/561 |
| 4,785,545 | 11/1988 | Aubele | 33/561 |

FOREIGN PATENT DOCUMENTS

| 373142 | 4/1923 | Fed. Rep. of Germany | 174/69 |
| 8101876 | 7/1981 | PCT Int'l Appl. | |
| 2049198 | 12/1980 | United Kingdom | 33/561 |

Primary Examiner—William A. Cuchlinski, Jr.
Assistant Examiner—Patrick R. Scanlon
Attorney, Agent, or Firm—Hopgood, Calimafde, Kalil, Blaustein & Judlowe

[57] ABSTRACT

Electrical-lead connections between stationary and movable parts of a probe head are rendered virtually insensitive to stress by wrapped development of the lead connections along the length of a spring connection between the stationary and movable parts.

1 Claim, 1 Drawing Sheet

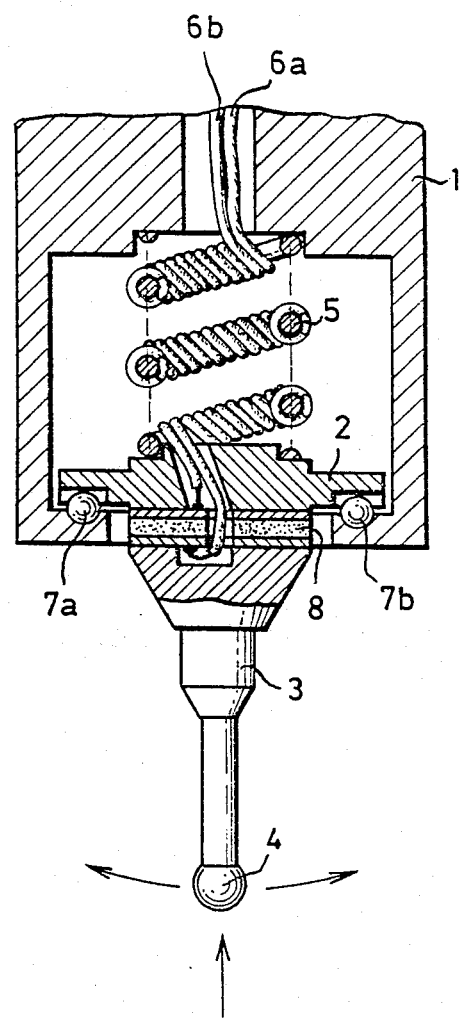

PROBE HEAD FOR A COORDINATE MEASURING INSTRUMENT

BACKGROUND OF THE INVENTION

Probe heads for coordinate-measuring instruments have a movable part which carries the probe pin and its work-contacting probe-tip ball; upon ball contact with a workpiece, the probe pin is deflected out of its position of rest against the force of one or more springs, generally coil springs, during a work-contacting procedure. This deflection motion is necessary to protect the probe head from damage as a result of unavoidably overshooting the contact position, due to drive action in the coordinate measuring instrument. Probe heads for coordinate-measuring instruments are illustratively described in West German Pat. No. 2,347,633 and OS No. 2,743,665, corresponding to U.S. Pat. No. 4,136,458.

The design of probe heads requires, on the one hand, the largest possible free stroke for probe deflection, so that high travel speeds and short measurement times can be obtained. On the other hand, the probe head should be structurally as small as possible, to enable contact with even the workpiece locations which are most difficult to access.

It is difficult to simultaneously satisfy both these requirements, particularly if cables (e.g. electrical wiring) must be brought to the movable part of the probe head. This is necessary, for example, in the case of probe heads which, like the pressure-sensitive sensors described in West German Pat. No. 2,712,181 (U.S. Pat. No. 4,177,568), or like the probe head described in International Application WO81/01876, employ electrical components such as a piezo-oscillator; if such electrical components are arranged on the movable part itself, frequent large deflection movements in a very small space entail the danger of cable breakage. Furthermore, additional restoring forces are attributable to the cable itself; and as a result of these added forces, the precision of measurement obtainable with the probe head is reduced, or the function of the probe head can even be entirely destroyed.

Admittedly, it is known to lay cables in loops in order to assure low cable stresses, in the circumstance of relative movement between parts connected to the cable. However, such an arrangement requires large structural space.

BRIEF STATEMENT OF THE INVENTION

The object of the present invention is so to arrange the cable connection between movable and stationary parts in a very small space within a probe head of a coordinate measuring instrument that the smallest possible stresses on the cable result, even for large deflections of the probe pin.

This object is achieved for a coil-spring configuration wherein the cables are so carried by the spring (5) as to follow the turns of the spring. Particularly good results are obtained if the cables are wound around and along the length of the wire of the spring.

As a result of having wrapped cables around the wire of the spring, movement of the cable is distributed uniformly over its entire length, so that restoring forces acting on the probe pin remain at a minimum, even for extreme deflections. At the same time, the cables are securely supported over their entire length between the movable and the rigid parts of the probe head and cannot move in an undefined manner.

DETAILED DESCRIPTION

A preferred embodiment of the invention will be described below with reference to the accompanying drawing, which is generally a vertical section of a probe head of the invention.

In the drawing, the housing 1 of a probe head will be understood to be mounted to a coordinate measuring instrument (not shown). Housing 1 constitutes the stationary part of the probe head, and it contains a mount which is formed of three angularly spaced balls 7 and a carrier plate 2; the carrier plate 2 mounts a probe pin 3 and its work-contacting ball tip 4, and a coil spring 5 continuously urges plate 2 to its at-rest position of contact with all three balls 7, thus uniquely establishing the probe-mounting axis when in said at-rest position. In the modified sectional view of the drawing, only two of the three bearing balls are visible, namely, balls 7a and 7b. The spring 5 is located, concentric with the probe-mounting axis, by upper and lower spring-locating seat formations, in housing 1 and on carrier 2, respectively.

Carrier plate 2 will lift off from one or two of the bearing balls 7 upon a deflection of the probe pin 3 from its position of rest. Pin 3 is seen in the drawing to be divided into two parts, by the bonded interposition of a piezoelectric sensor 8 which supplies the contact signal. From the sensor 8, a cable connection consisting of two insulated conductors 6a and 6b leads via a first electrical-lead passage radially within the spring-locating seat formation of the housing to a socket (not shown) at the upper end of the housing 1. The piezoelectric sensor 8 is annular and concentric with the probe-mounting axis, and its central opening communicates with a second electrical-lead passage through the carrier 2 and radially within the spring-locating seat formation of the carrier.

The cable conductors are wrapped around the spring wire following the turns of the spring 5 and are thus fastened to the spring 5 over its entire length. In this way, upon every deflection of the probe pin 3, stresses acting on the cabling are distributed uniformly over its entire length.

Although the invention has been described in detail in the context of cabling for a deflectable work-contacting probe, it will be understood that other embodiments of the concept will find application, in other contexts on coordinate-measuring instruments. For example, a resiliently mounted detector which provides anti-collision protection of the entire probe head, can also be electrically served by flexible conductors that are similarly wrapped around a coil spring of the involved resilient suspension.

We claim:

1. A probe head for a coordinate-measuring machine, said head comprising a fixed housing having a probe-mounting cavity that (1) is centrally open on a probe-mounting axis at a probe-mounting end and (2) has a circular coil-spring-seat formation on said axis at an opposite end, said housing having an electrical-lead passage communicating with said cavity radially within the circular confines of said seat formation, a movable probe-carrier part within said cavity and having a central axis of probe-pin support, means co-acting between said carrier part and said probe-mounting end for retaining said carrier part within said cavity and for uniquely determining an at-rest position of said carrier part, with the central axis of said carrier part on said probe-mounting axis, a second circular coil-spring-seat formation at one axial end of said carrier part and in axially spaced confronting relation to said first-mentioned seat formation, said carrier part having an electrical-lead passage communicating with said cavity radially within the confines of said second seat formation, a coil spring retained by and between said seat formations and continuously reacting between said fixed housing and said carrier part to urge said carrier part into said at-rest position, an annular piezoelectric transducer mounted to the other axial end of said carrier, said transducer being concentric with said axis when said carrier is in said at-rest position, and said transducer having an axial opening communicating with the lead passage of said carrier, a probe pin mounted to said transducer and having at least a mounting end thereof concentric with said axis when in said at-rest position, and flexible lead conductors for said transducer, said conductors entering said chamber via the passage through said first seat formation and being thence in helically wrapped close conformance with the coils of said spring and being thence operatively connected to said transducer via the passage through said second seat formation, whereby lead connections to and from said cavity are radially inward of the coils of said spring and are positively located by the coils of said spring between the respective ends of said spring.

* * * * *